United States Patent
Rapakko et al.

(10) Patent No.: US 7,281,246 B1
(45) Date of Patent: Oct. 9, 2007

(54) METHOD FOR LOADING USER INTERFACE SOFTWARE

(75) Inventors: Jouni Rapakko, Kylmäkoski (FI); Sami Pajusaari, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/575,342

(22) Filed: May 19, 2000

(30) Foreign Application Priority Data

May 24, 1999 (FI) ....................................... 991167

(51) Int. Cl.
  G06F 9/445 (2006.01)
  G06F 13/00 (2006.01)
(52) U.S. Cl. ....................................... 717/175; 710/302
(58) Field of Classification Search ........ 717/160–178; 709/328–331; 713/1, 2, 300, 340; 710/301–302, 710/312, 10–18; 714/48
  See application file for complete search history.

(56) References Cited

U.S. PATENT DOCUMENTS

| | | | | |
|---|---|---|---|---|
| 5,319,751 A | * | 6/1994 | Garney | 711/115 |
| 5,537,597 A | | 7/1996 | Sandage | 395/700 |
| 5,553,223 A | | 9/1996 | Greenlee et al. | 395/155 |
| 5,675,795 A | * | 10/1997 | Rawson et al. | 713/2 |
| 6,081,850 A | * | 6/2000 | Garney | 710/15 |
| 6,263,387 B1 | * | 7/2001 | Chrabaszcz | 710/302 |
| 6,317,826 B1 | * | 11/2001 | McCall et al. | 713/1 |
| 6,374,353 B1 | * | 4/2002 | Settsu et al. | 713/2 |
| 6,405,362 B1 | * | 6/2002 | Shih et al. | 717/174 |

FOREIGN PATENT DOCUMENTS

| | | |
|---|---|---|
| EP | 0 672 987 A2 | 9/1995 |
| EP | 0 696 855 A2 | 2/1996 |
| EP | 0 812 120 A2 | 12/1997 |
| WO | WO97/20431 | 5/1997 |

* cited by examiner

*Primary Examiner*—Tuan A Vu
(74) *Attorney, Agent, or Firm*—Perman & Green, LLP

(57) ABSTRACT

An electronic device, a storing means and a method for loading the user interface software of an expansion card in the electronic device. The electronic device comprises means for loading, starting and executing program modules in the electronic device. The expansion card can be coupled in a releasable manner to the electronic device. The user interface software is divided at least into a basic module and a user interface module. The loading of the user interface software is executed at least in two phases, wherein in the first phase the loading and start-up of the basic module is conducted, and in the second phase the loading and start-up of the user interface module is conducted. The second phase is conducted when the expansion card is coupled to the electronic device.

31 Claims, 3 Drawing Sheets

METHOD FOR LOADING USER INTERFACE SOFTWARE

CROSS-REFERENCE TO RELATED APPLICATIONS

Not Applicable

STATEMENT REGARDING FEDERALLY SPONSORED RESEARCH OF DEVELOPMENT

Not Applicable

BACKGROUND OF THE INVENTION

1. Field of the Invention

Figure 1:
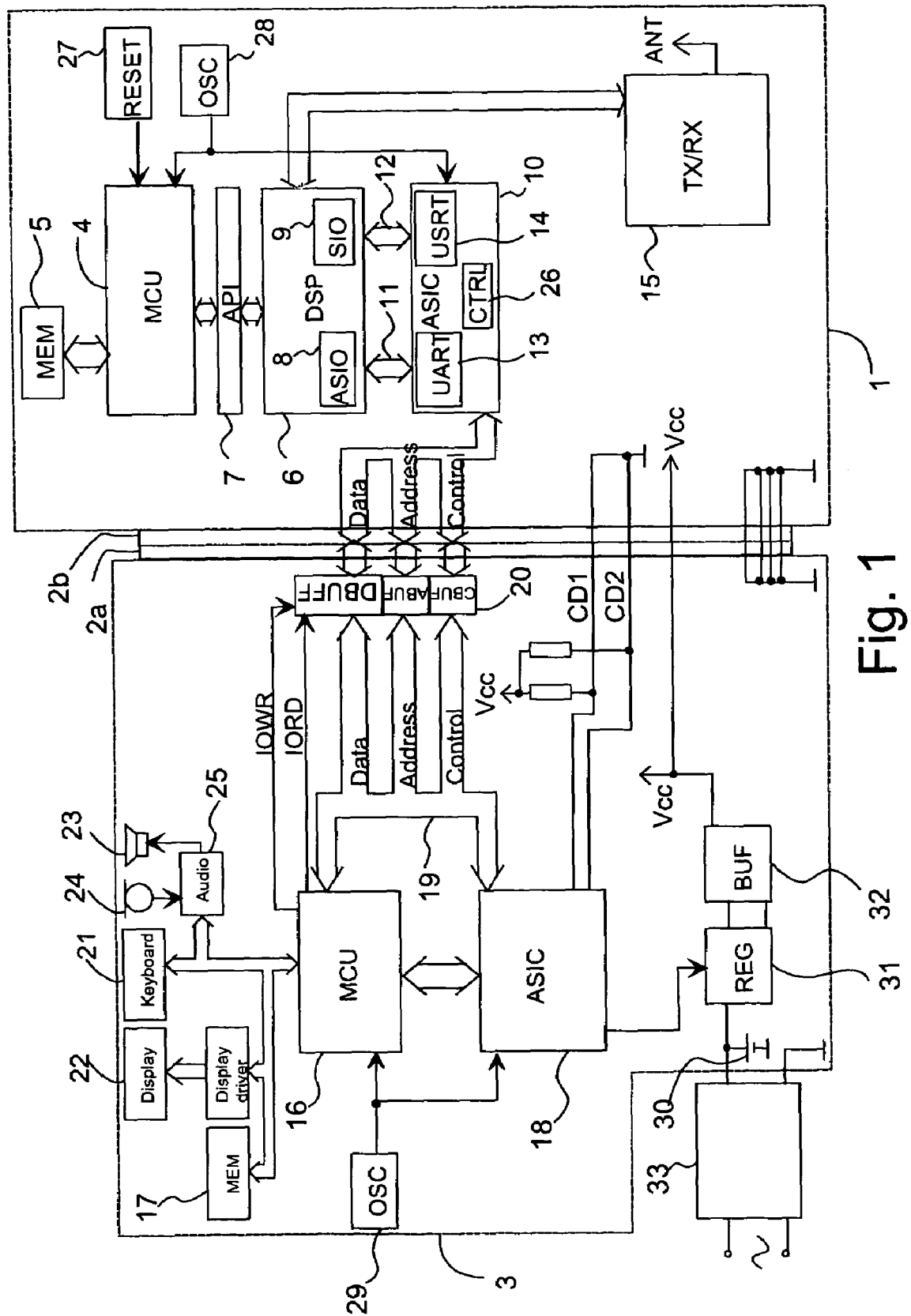

The present invention relates to a method for loading user interface software of an expansion card in an electronic device, the method comprising means for loading, activating and executing program modules in an electronic device, which expansion card can be coupled in a releasable manner to the electronic device. The invention also relates to an electronic device which comprises means for loading user interface software in the electronic device, means for coupling an expansion card in a releasable manner in the electronic device and means for loading, activating and executing program modules in the electronic device. Moreover, the invention relates to a storage means for the user interface software and loading program of an expansion card in an electronic device, which expansion card can be coupled in a releasable manner to the electronic device.

2. Description of the Related Art Including Information Disclosed Under Disclosed Under 37 CFR 1.97 and 1.98

The PCMCIA interface (Personal Computer Memory Card International Association) is a known interface which is used in connection with electronic devices to couple expansion cards, such as memory cards (e.g. FLASH memory cards), modems and different input/output cards (I/O) to an electronic device. Thus, the electronic device and the PCMCIA card are provided with connectors according to the PCMCIA standard in such a way that the connector of the electronic device is a so-called male connector, i.e. it is equipped with contact pins, and the connector of the card is a so-called female connector, i.e. it is equipped with contact sockets, wherein when the PCMCIA card is coupled to the PCMCIA connector of the electronic device, an electrical coupling is formed between each contact pin and corresponding contact socket. The PCMCIA standard determines the typical function of each contact pin and contact socket, respectively. Thus, for example in an application in which the PCMCIA interface is implemented in a computer, each data line of the data bus in the computer is coupled to a PCMCIA contact pin. Furthermore, at least some of the address and control lines are directed to the connector.

The PCMCIA cards have the size of a credit card (85.6 mm×54 mm), but the thickness of the cards can be either 3.3 mm (Type I), 5.0 mm (Type II) or 10.5 mm (Type III). Electrically, the PCMCIA cards are coupled to an electronic device in a 8/16 bit I/O interface or memory. A card according to the PCMCIA standard is equipped with a memory area which can be read by the electronic device and which contains information for identifying the card, i.e. a so-called card information structure (CIS).

Particularly in connection with portable data processors (Laptop PC), mobile station applications have been developed in which at least the transmitter/receiver unit of the wireless communication device is provided in a card format of the PCMCIA standard. The unit used for controlling the function of the card is advantageously a microcontroller (MCU) which is equipped with a processor, memory (RAM, ROM) and I/O lines for coupling the microprocessor to the electronics of the card. Furthermore, external memory may also be coupled in connection with the microcontroller.

The transmitter comprises for instance a modulator for modulation of the signal to be transmitted, filters for attenuation of spurious emissions in particular, a mixer in which the modulated signal is mixed with the local oscillator frequency in order to generate a radio frequency signal, and an output stage for amplification of the signal to be transmitted. The amplified signal is conveyed to an antenna, which is coupled to the card e.g. via a cable. The receiver comprises for instance filters for filtering the received signals, a mixer for converting the radio frequency signal to be received into an immediate frequency or, in a receiver of the direct conversion type, into the baseband, and a demodulator for demodulating the received signal.

To control the function of a card-like wireless communication device, so-called user interface software has been developed. By means of such user interface software it is possible to control the functions of a card-like wireless communication device from a data processor. By means of the software it is possible to control e.g. speech calls, transmission and reception of text messages, call diversion set-ups, etc. Moreover, by means of the user interface software the user can enter and edit possible access codes, such as a personal identification number (PIN), a personal unblocking key (PUK), or other security codes of the wireless communication device.

When a data processor is started, a so-called operating system, such as Windows®95, Windows®98, or Windows®NT by Microsoft, is activated. The purpose of the operating system is to control the function of the data processor. In connection with the loading of the operating system, so-called device drivers are also loaded in the program memory of the electronic device. The device driver is a set of program codes which are used to effect the operating of controlling the expansion cards, keyboard, display device, serial ports or corresponding elements that are coupled to the data processor. There are different types of device drivers for different purposes of use, which is prior art known as such by anyone skilled in the art, and thus requires no further discussion in this context.

In some operating systems of prior art, the user interface software can be loaded from the device driver, as for example in Windows®95 and Windows®98 operating systems. When the loading is effected from the device driver, the device driver is loaded for example when a card-like wireless communication device is coupled to the data processor, if the operating system of the data processor is provided with a so-called plug-and-play function. Thus an identification coupling arranged in the expansion card interface indicates that the card-like wireless communication device is coupled to the data processor. After the identification, a control program of the expansion card interface is executed in the operating system for example to examine the CIS database of the card coupled to the interface. On the basis of the type of the card the operating system loads the corresponding device driver. After being started the device driver executes the loading of the user interface software in the memory of the data processor, whereafter the user interface software is started.

In every operating system of prior art, the user interface software cannot be loaded from the device driver. An example of such a operating system is Windows®NT. In that case the user interface software can be loaded in such a way, that the user of the data processor has for example at the installation stage of the user interface software determined the activation of this user interface software in the start-up settings of the operating system. In this alternative, the user interface software is thus always loaded in connection with the activation of the operating system, or when the user logs in to the operating system. The loading is effected even though the card-like wireless communication device is not coupled to the data processor, and even though the user has no need to use the card-like wireless terminal. Thus, the memory capacity of the data processor is unnecessarily occupied. Furthermore, the amount of time passed in the loading of the operating system can be significantly increased, especially when the user interface software to be loaded is large in size.

In a user interface software of prior art, the shut down of the user interface software is implemented in a situation where a card-like wireless terminal is not connected to the data processor. Thus, memory capacity is released for other use. This solution does not, however, reduce the amount of time passed in the loading of the user interface software in connection with starting the operating system. Furthermore, this loading method has the drawback that the user interface software cannot be activated again automatically, if a card-like wireless terminal is connected to the data processor after starting the operating system, if the user interface software has already been shut down.

Thus, when solutions of prior art are used, one has to know in which way the start-up of the user interface software can be implemented in the operating system used at a given time. This complicates the installation of the software and may cause error situations. In addition, these different loading alternatives have to be taken into account in the manufacture of the user interface software, and thus different operating systems types have to be provided with at least partly different versions of the operating software, which also complicates the development and maintenance of the program.

Another drawback of the solutions of prior art is that it is difficult to implement different language versions. If the device driver detects an error in connection with the start-up, the error messages have to be either in one language, or separate device drivers have to be produced for the different language versions. This feature also complicates the installation of the device drivers and increases the amount of work required for manufacture and maintenance. In practical applications it is not, however, sensible to print the error messages from the device driver, because in several operating systems the entire system is halted until the user acknowledges the error messages. On the other hand, in every operating system, such as Windows®NT and Windows®2000, it is not even possible to print the error messages from the device driver.

BRIEF SUMMARY OF THE INVENTION

One purpose of the present invention is to produce a new method for automatic loading of the operating software of a card-like wireless communication device to a data processor, and an electronic device applying the method. The invention is based on the idea, that in connection with the electronic device, a loading program module is arranged, which module is provided with functions for effecting the loading of the user interface when a card-like wireless communication device is coupled to the electronic device, substantially irrespective of the operating system used at a time. The method according to the present invention is characterized in that the user interface software is divided at least into a basic module and a user interface module, that the loading of the user interface module is executed in at least two phases, where in the first phase, the loading and start-up of the basic module is conducted, and in the second phase the loading and start-up of the user interface module is conducted, and that the second phase is conducted when the expansion card is coupled to the electronic device. The electronic device according to the present invention is characterized in that the user interface software is divided at least into a basic module and a user interface module, that means for loading the user interface software comprise means for loading and starting the basic module and means for loading and starting the user interface module, and that the loading of the user interface module is arranged to be effected when an expansion card is coupled to the electronic device. Furthermore, the storing means according to the present invention is characterized in that the user interface software is divided at least into a basic module and a user interface module, and that the loading program comprises procedures for loading the user interface software in at least two phases, wherein in the first phase, the loading and start-up of the basic module is arranged to be conducted, in the second phase the loading and start-up of the user interface module is arranged to be conducted, and that the second phase is arranged to be conducted when an expansion card is coupled to the electronic device.

With the present invention, considerable advantages are achieved when compared with solutions of prior art. Because in the data processor according to the invention the entire user interface program is not loaded at once, the start-up of the operating system is significantly faster. Furthermore, the method is substantially independent of the operating system, and thus the installation is less complicated and the amount of work required for product development and maintenance is smaller than in methods of prior art. By means of the operating software according to the invention it is possible to implement different language versions with relatively small additional expenses. In the method according to the invention, it is also possible to implement the act of informing the user of the possible error situations in different languages in a sensible manner so that the operating systems does not stop to wait for the acknowledgement of the error message.

BRIEF DESCRIPTION OF THE SEVERAL VIEWS OF THE DRAWING(S)

Figure 2:
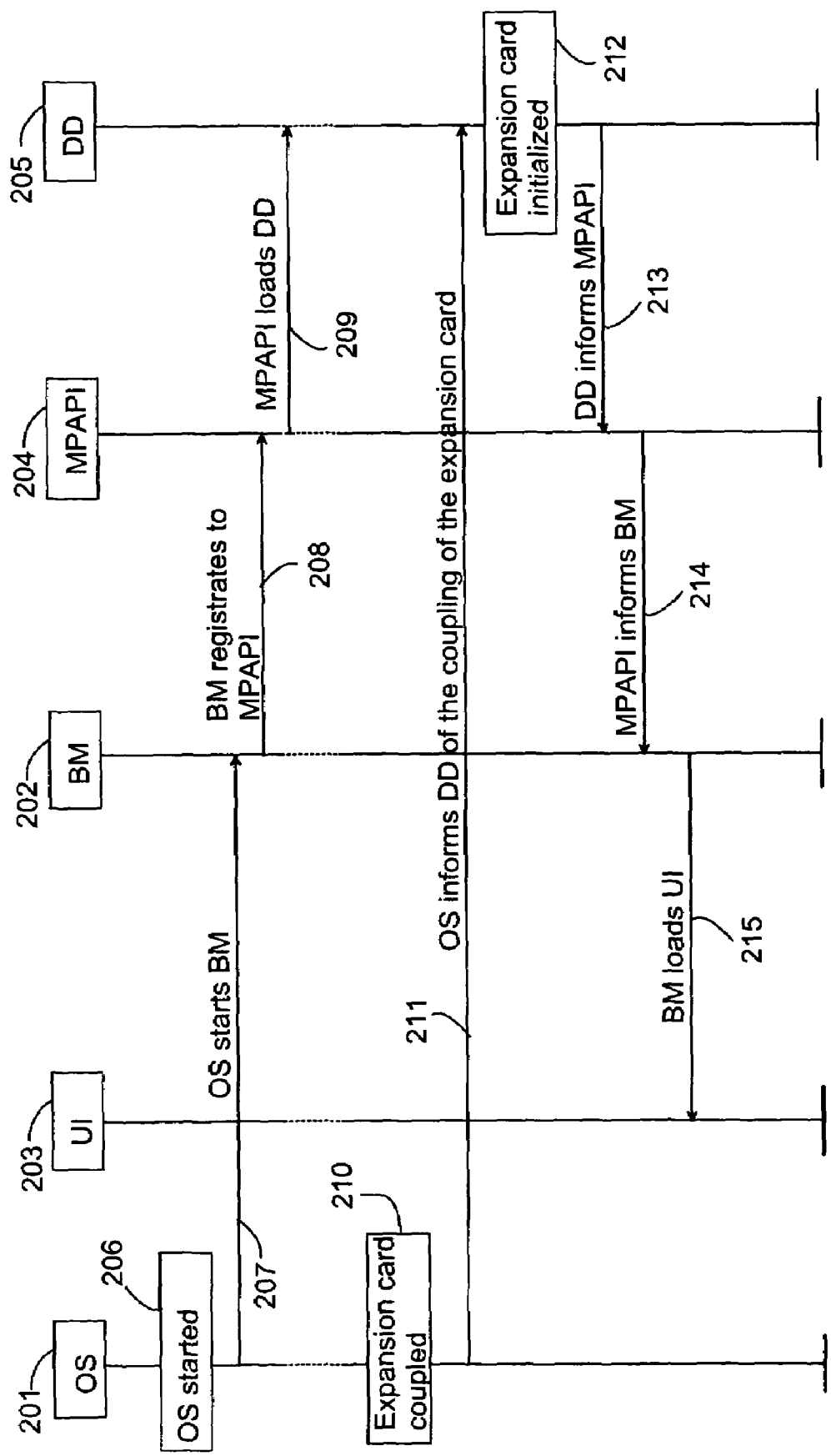
Figure 3:
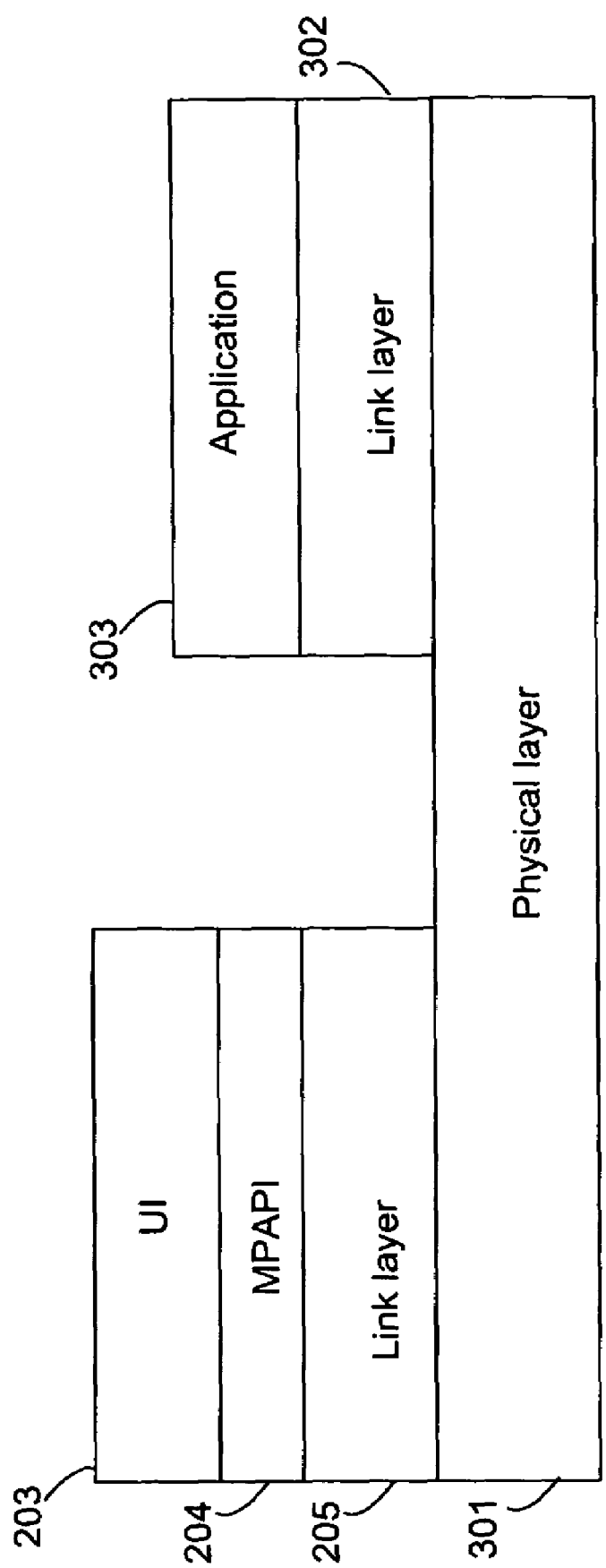

In the following, the invention will be described in more detail with reference to the appended drawings, in which FIG. 1 is a reduced block diagram showing a preferred expansion card and electronic device, in connection with which it is possible to apply the invention, FIG. 2 is a reduced arrow diagram showing a method according to a preferred embodiment of the invention, and FIG. 3 shows information transmission between an expansion card and an electronic device.

DETAILED DESCRIPTION OF THE INVENTION

FIG. 1 is a reduced block diagram showing a preferred expansion card 1 in connection with which it is possible to apply the invention. The expansion card 1 comprises an expansion card interface 2b, by means of which the expansion card 1 can be coupled to an electronic device 3, such as a portable data processor. The electronic device 3 comprises a corresponding expansion card interface 2a, for example an interface according to the PCMCIA standard. Thus, the expansion card interface 2a of the electronic device advantageously comprises a male connector (not shown), to which the expansion card 1 is coupled by means of an expansion card interface 2b of the expansion card, which interface advantageously comprises a female connector (not shown). Hereinbelow, the common term "expansion card interface" and the reference numeral 2 will be used for this expansion card interface 2a of the electronic device and the expansion card interface 2b of the expansion card. This expansion card interface 2 can also be other kind of interface than an interface according to the PCMCIA standard. The expansion card interface 2 advantageously comprises an address bus, a control bus and a data bus. The address bus typically consists of several address lines by means of which the electronic device 3 of capable of addressing the different functional parts of the expansion card 1. Correspondingly, by means of the control bus it is possible to transmit control information, e.g. interrupt requests and state changes from the expansion card 1 to the electronic device 3. Control information can also be transmitted from the electronic device 3 to the expansion card 1. In the data bus which is typically of parallel form, there are also several data lines, for example eight data lines, allocated for data transmission, wherein it is possible to transmit one 8-bit byte at a time between the expansion card 1 and the electronic device 3. All interface lines in the expansion card interface are not shown, but only those by means of which it is possible to illustrate the present invention.

The electronic device 3 is for example a device, such as a personal computer (PC) or a portable computer (laptop PC), which comprises data processing functions. The expansion card 1 is advantageously a card, such as a radio card, containing mobile phone functions, but it is obvious that the invention can be applied also in connection with other electronic device 3 and expansion cards that can be connected thereto.

Of the expansion card 1, only such blocks are shown which are necessary for the function of the expansion card 1 and for the understanding of the invention. To control the function of the expansion card, a controller 4, advantageously a micro control unit MCU is used. The controller 4 is provided with a memory 5, such as read-only memory (ROM) for storing application programs or the like, and random access memory (RAM) e.g. for storing data during the use. At least part of the memory 5 is advantageously non-volatile random access memory (NVRAM). The application programs can also be stored in such a non-volatile random access memory, wherein it is easier to change the application program versions. Also, a so-called FLASH memory is known, which is a kind of non-volatile random access memory.

The functional parts, such as serial interface blocks 9, 10 and a CIS database, which can be addressed via the extension bus by the extension card 1, are specified in different physical addresses in the interface area. The address area is for example 256 bytes, wherein it takes 8 address lines (A0 ... A7) to indicate the addresses of the interface areas. Via the expansion card interface 2, the reading of the CIS database of the expansion card 1 is executed advantageously in such a way that the controller 16 of the electronic device sets the address of the CIS database into the address bus of the interface bus 19 as well as the state of the read line (IORD) in the control bus of the interface bus 19 into the logical value corresponding to the read enable state, e.g. the logical 1 state. Thus, by the expansion card 2 the first value (byte/word) of the CIS database is transferred in the data bus of the expansion card interface 2. At a time, it is possible to read such a number of bits which corresponds to the width of the data bus, typically one byte i.e. 8 bits or two bytes i.e. one word.

The controller 4 of the expansion card transmits information to a digital signal processing unit 6 (DSP), by means of which it is possible to implement different signal processing procedures, such as filtering. Data transmission between the controller 4 of the expansion card and the digital signal processing unit 6 is advantageously conducted via a control and data block 7 (API). This control and data block is implemented advantageously with a dual port ram known as such. Thus, the controller 4 has separate address, control and data lines to the control and data block 7, and correspondingly, the digital signal processing unit 6 has separate address, control and data lines coupled to the control and data block 7. When the controller 4 writes data in the control and data block 7, the control and data block 7 transmits information thereto to the digital signal processing unit 6 which on the basis of this reads the written data. Corresponding procedures are executed in the opposite direction when the digital signal processing unit 6 writes data in the control and data block 7, the controller 4 is notified thereof and it reads the written data.

In this preferred embodiment, the digital signal processing unit 6 comprises an asynchronous serial interface block 8 (ASIO) and a synchronous serial interface block 9 (SIO). By means of these it is possible to transmit information in serial format between the digital signal processing unit 6 and a peripheral circuit, in this case a bus adapter 10. This will be described in more detail hereinbelow.

The bus adapter 10 of the expansion card is advantageously implemented with an application specific integrated circuit (ASIC). This bus adapter 10 is connected with two serial buses 11, 12 to the digital signal processing unit 6 in order to transmit information. In this advantageous embodiment, the first serial bus 11 is a so-called fast asynchronous serial bus (ASIO), which is connected to the asynchronous serial interface block 8 of the digital signal processing unit 6. The second serial bus 12 is a so-called synchronous serial bus (PCMBUS), which is connected to the synchronous serial interface bus 9 of the digital signal processing unit 6. The bus adapter 10 comprises an asynchronous transmitter/receiver block 13 (UART, Universal Asynchronous Receiver Transmitter) for the first serial bus 11, and a synchronous transmitter/receiver block 14 (USRT, Universal Synchronous Receiver Transmitter) for the second serial bus 12. These transmitter/receiver blocks 13, 14 conduct serial/parallel conversions for the information to be transmitted between the expansion card interface 2 and the serial bus 11, 12. These serial/parallel conversions are necessary when the expansion card 1 functions in the first operating mode, which in this first preferred embodiment corresponds to the operating mode according to the PCMCIA standard. Thus, via the expansion card interface 2 the information is transmitted in parallel format.

The expansion card 1 also comprises a transmitter/receiver unit 15, which is for example a transmitter/receiver applying the GSM standard, and in which for example the modulation/demodulation and channel coding/decoding is conducted, in a way known as such.

The supervision circuit 27 (RESET) of the expansion card maintains the controller 4 of the card in the initial mode when the operating voltage of the card is too low for some reason. Thereby the malfunctions of the controller 4 are prevented e.g. during the process of switching on the operating voltages.

The clock circuit 28 of the expansion card generates timing signals necessary for the function of the expansion card 1.

The electronic device 3 according to FIG. 1 comprises for instance a controller 16, which can be for example a microprocessor or a micro controller. The electronic device 3 is also provided with a memory 17, such as random access memory, read-only memory and possibly also writable mass memory. Some of the logical functions necessary for the function of the electronic device are implemented advantageously by means of an application specific logical circuit 18, which is arranged in a data transmission connection e.g. with the controller 16 of the electronic device. From the controller 16 and the application specific logical circuit 18, an interface bus 19 is directed to the expansion card interface 2. This interface bus 19 comprises for instance an address bus, a control bus and a data bus. The expansion card interface 2a of the electronic device is typically also provided with bus buffering means 20, which connect the interface bus 19 and the expansion card interface 2a in such a way that possible external interferences cannot easily damage the components of the electronic device 3. In the block diagram of FIG. 1, these bus buffering means 20 are shown in one block for each bus (address, control and data bus), but their more detailed implementation is obvious for anyone skilled in the art.

The electronic device 3 according to FIG. 1 also comprises a keypad 21, by means of which the user can control the function of the electronic device 3. The electronic device 3 can generate different information to be presented in the display device 22 for the user. Furthermore, the electronic device 3 can comprise a speaker 23 and a microphone 24 which are connected by means of an audio block to the controller 16. The speaker 23 and the microphone 24 can be used for example in connection with an audio call, wherein the expansion card 1 does not necessarily require a speaker and a microphone or a separate audio interface.

The clock circuit 29 of the electronic device generates timing signals necessary for the function of the electronic device 3. The operating voltage Vcc is produced for example by means of a battery 30, a regulating block 31 and a buffering block 32. By means of the buffering block, possible variations in loading are balanced, and it is also possible to produce several voltages, e.g. the actual operating voltage Vcc and a programming voltage. The battery is advantageously loaded by means of a charger 33.

Already at the installation stage, application software controlling the function of the expansion card 1 is stored in the electronic device 3. This application software according to a preferred embodiment of the invention comprises for instance a basic module 202 (BM, FIG. 2), a user interface module 203 (UI) and a device driver 205 (DD). The device driver 205 can also be a universal device driver, which is stored in the memory means 17 of the electronic device, advantageously in connection with the installation of the operating system 201.

In the following, the function of the method according to the invention will be described with reference to the coupling of FIG. 1 and the arrow diagram of FIG. 2. In connection with the start-up of the electronic device 3, an operating system 201 (OS) such as Windows ®95 is started. The user interface software of the expansion card 1, such as a card-like wireless communication device, can also be started in an operating electronic device 3, for example in connection with the so-called login of the user. In connection with the loading of the operating system 201 (block 206 in the diagram of FIG. 2), device drivers have also been loaded in the program memory of the electronic device 3, the device drivers being used for controlling e.g. the keyboard 21, the display device 22, the serial ports (not shown) and the like.

It is presumed that advantageously in the operating system 201 of the electronic device 3, the start-up of an application programming interface 204 (MPAPI) is also set in connection with the start-up of the operating system. This application programming interface 204 is for example a mobile phone application.

In connection with the start-up of the operating system 201, the basic module 202 according to the invention is advantageously started. This is shown by arrow 207 in the diagram of FIG. 2. This basic module 202 is an application program in which functions necessary for the implementation of the method according to the invention are applied by means of program codes, which functions will be described in more detail hereinbelow. The basic module 202 transmits a message to the application programming interface 204, to notify that it is ready e.g. to receive messages indicating the coupling and state changes of the expansion card 1 (arrow 208). The transmission of these messages can be implemented for example with memory means 17 of the electronic device, or with possible signalling mechanisms of the operating system 201 in a way known as such.

Advantageously, when the application programming interface 204 receives the information on the activation of the basic module 202 (arrow 209), the application programming interface 204 loads in this preferred embodiment the device driver 205 of the expansion card 1 in the memory means 17 of the electronic device, and initiates its function. The device driver 205 comprises a program code e.g. for controlling the expansion card interface 2, writing data on the data bus, reading the data from the data bus and transmitting the data to the application, such as the application programming interface 204. The start-up of the device driver 205 can also be implemented in such a way that it is loaded and started only after coupling the expansion card 1, wherein the stage 209 is conducted in that connection.

After the aforementioned procedures, the function of the operating system continues in a way known as such, and the user can execute operating functions of the electronic device 3. When the expansion card 1 is coupled to the electronic device 3, the coupling can be detected for example in such a way that the expansion card 1 uses card detect lines CD1, CD2 to ground the pins allocated for this purpose in the connector, wherein an interrupt signal is produced to the controller 16 of the electronic device. Thus, the operating system 201 proceeds to execute a corresponding interrupt service program (block 210), which contains the necessary procedures programmed therein, the procedures including e.g. the coupling of the voltages to the expansion card 1 and advantageously the reading of the CIS database or the like of the expansion card. The operating system 201 examines the type of the expansion card 1 coupled to the electronic device 3 e.g. from said CIS database. The CIS database advantageously contains information on the type, version and manufacture of the card, wherein on the basis of this information the operating system 201 is capable of determining the expansion card 1 in question. Thereafter the operating system 201 informs the device driver 205 which is intended to control the expansion card, that the card is coupled to the electronic device 3 (arrow 211).

The device driver 205 also executes the initialization of the function of the expansion card 1, i.e. for example the setup of the operating parameters necessary for the use of the expansion card (block 212). Furthermore, at this stage, a data transmission connection is advantageously established between the expansion card 1 and the data processor 3 via the expansion card interface 2.

In the expansion card the controller 4 and the digital signal processing unit 6 conduct initialization procedures e.g. to set the operating parameters of the expansion card, which is known as such. When the initialization procedures have been executed, information indicating whether the expansion card is ready to operate is transmitted to the electronic device 3 advantageously in such a way that the controller 4 of the expansion card produces a "clear to send" message CTS by means of the state change (0/1) of CTS line in the asynchronous serial interface block 8 of the digital signal processing unit. This CTS line is not shown separately in the appended figures, but it is implemented in a way known as such advantageously in the first serial bus 11. The control block 26 of the bus adapter detects the change in the state of this CTS line and produces an interrupt request to the electronic device 3 via the extension card interface 2. The controller 16 of the electronic device detects the interrupt request and proceeds to execute the device driver 205 again, wherein the device driver 205 knows that the expansion card is ready to operate and capable of receiving commands. The device driver 205 transmits information on the setting of the operating mode of the expansion card 1 advantageously also to the application programming interface 204.

If an error occurs in the start-up of the expansion card 1, the controller 4 of the expansion card produces an error message thereof as well, which error message is transmitted to the electronic device 3. Thus, the device driver 205 transmits an error message advantageously to the basic module 202, in which the error message is examined. The error message can be presented to the user by producing a message corresponding to the error in text and/or graphic format in the display 22 and/or an audio message in the speaker 23. In this method, the error messages can be easily modified according to different language versions, and thus the user can select the desired language for example at the installation stage of the software.

Correspondingly, the device driver 205 transmits information to the application programming interface 204 (arrow 213). The application programming interface 204 transmits information on the coupling of the expansion card 1 further to the basic module 202 (arrow 214), which has already been loaded and started by the operating system 201. The basic module 202 receives the information on the coupling of the expansion card 2 to the electronic device and initiates the loading and start-up of the user interface module 203 of the coupled expansion card (arrow 215).

To load the user interface module 203, the basic module 202 conducts program commands by means of which a message indicating the loading of a particular program module is advantageously transmitted to the operating system 201. This program module is named in a manner which is recognized by the operating system 201, and stored at the installation stage e.g. in the memory means 17 of the electronic device 3. The loading of the program module is conducted for example in such a way that the operating system 201 copies the program module in the memory means from the permanent memory, such as ROM, to the data memory, such as RAM, and stores in its registers information on the starting address of the loaded program module. This starting address can be notified to the basic module 202, wherein the basic module 202 can directly control the function of the user interface module 203.

Another alternative for implementing the mutual function of the basic module 202 and the user interface module 203 is that the modules 202, 203 communicate by means of message transmission modules of the operating system 201. It is obvious that in practical applications these loading and start-up stages can be implemented in another known manner, and the present invention is not restricted solely to the facts presented in this description.

After said loading and start-up procedures the user can utilize the user interface module 203 to control the function of the expansion card 1. In a way known as such, the user interface module 203 has advantageously produced a program window in the display 22 of the electronic device 3 to present the information. The program window can also contain input fields in which the user can input information by means of the keyboard 21 of the electronic device, or possibly also by means of audio commands via the microphone 24. For audio control the electronic device 3 is provided with means (not shown) for converting the audio commands into text format, or other suitable format that can be understood by the operating system. In the program window there may also be selection fields, e.g. for handset key functions, data call, speed call, fax-transmission, etc. Furthermore, this program window advantageously displays information on the operating mode of the expansion card and on the possible faults in the expansion card 1. It is obvious that the telephone application program mentioned herein is merely an example of the application programs suitable for operating the expansion card 1, but the invention can also be applied in other types of expansion cards and application programs.

If necessary, the user can enter his/her own identification code by means of which the access right of the expansion card can be confirmed. After entering the identification code the user can e.g. start call setup, answer incoming calls, change the settings of the expansion card 1, such as the data transfer rate, identification code, etc.

If an error occurs in the loading of the user interface module 203, the basic module 202 can notify the user of this error in the display 22 and/or the speaker of the electronic device. Since the basic module 202 according to the preferred embodiment of the invention is also implemented as a program module functioning under the operating system, it is easy to modify the messages of the basic module according to the different language versions without a need to interfere with the structure of the program as such. The texts of the different language versions are thus implemented e.g. in separate files, of which the desired language version is stored in the memory means 17 for example at the installation stage. If the free storage capacity is sufficient in the memory means 17 of the electronic device 3, it is possible to store the texts of different language versions in the memory means 17, and the desired language version is taken in use only when starting the program.

The detachment of the expansion card 1 from the electronic device 3 can be correspondingly detected from the state changes in the identification lines of the card. This situation also advantageously produces an interrupt request to the controller 16 of the electronic device, in which an interrupt service program is executed. Thus, information on the detachment of the expansion card 1 is transmitted to the device driver 205 which transmits the information to the application programming interface 204. The application programming interface 204 informs the basic module 202 and the user interface module 203. Thereafter the user interface module 203 is halted for example in such a way that the user interface module 203 stops itself. Thus, memory is deallocated in the memory means 17 of the electronic device 3 for the use of other applications. However, preferably at least the basic module 202 and advantageously also the application programming interface 204 and the device driver 205 continue their operation. The basic module 202 remains in the memory after being started until the operating system is halted either to turn off the electronic device 3 or to restart the operating system, or until the user logs out of the operating system.

After the detachment the expansion card 1 can be coupled to the electronic device again. Also in this situation the loading of the user interface module 203 by means of the method according to the invention is possible when the basic module is operating. The process is substantially similar to the above example illustrating the coupling of the expansion card, and reference is made thereto in this context.

It is possible that there is a user profile function available in the operating system 201, by means of which different users can define individual settings for the operating system 201. The user can define the application programs to be started when the user in question logs in to the operating system. Thus, the operating system 201 starts these applications. In the present invention, the start-up of the basic module 202 is not, however, dependent on the user profile functions. The basic module 202 is preferably started in connection with the login to the operating system 201. If the expansion card is coupled to the electronic device 3 before the basic module is started, the following steps will be taken in the method according to the preferred embodiment of the invention.

The operating system has informed the device driver 205 of the coupling of the expansion card 1. The application programming interface 204 has loaded the device driver 205 which has initialized the function of the expansion card 1 and informed the application programming interface 204 that it is ready for operation. When the basic module 202 is stated it asks the application programming interface 204 to inform whether the expansion card 1 is ready to operate. Thus the basic module 202 loads and starts the user interface module 203, as disclosed earlier in this description.

Yet another example of the way in which the electronic device 3 and the expansion card 1 are capable of communicating with each other via the expansion card interface 2, will be described in the following. The expansion card 1 is set to function e.g. as an interface card (I/O). For example the PCMCIA standard describes in more detail the requirements of different card types (I/O card and memory card) in expansion cards according to PCMCIA standard e.g. with respect to the register structure and the contact pins. Shortly it is stated in this context that determined memory areas and interface areas can be addressed by the controllers 4, 16. The memory area is typically much larger in size (even several megabytes) than the interface area (couple of hundred bytes or kilobytes). Separate control lines (e.g. read and write lines RD, WR) are arranged for processing the memory area, and correspondingly, separate control lines (e.g. read and write lines IORD, IOWR), are arranged for processing the interface area. The area to be processed is addressed by the address lines of the address bus, there being e.g. 32 address lines for addressing the memory area, and some of them (8/16) are used to address the interface area. The control lines are used to determine in more detail the area which is being processed and, on the other hand, whether the controller is reading or writing information. The data bus is used for reading and writing information.

The asynchronous transmitter/receiver block 13 and the synchronous transmitter/receiver block 14 is specified in different physical addresses within the interface area. In memory cards the address area is preferably a memory area. The address area is e.g. 256 bytes, wherein eight address lines (A0 . . . A7) are required to indicate their addresses. The controller 16 of the electronic device sets the desired device address in the address bus of the interface bus 19. Thereafter in the control bus, the state of the read line (IORD) is set in the state in which information is transmitted from the expansion card 1 to the data bus of the expansion card interface 2. Typically, reversed logic is used, i.e. when the read line is in the logical 1 state, data is not written in the data bus, and correspondingly, in the logical 0 state writing is allowed. Writing on the expansion card 1 via the expansion card interface 2 is advantageously conducted in such a way that the controller 16 sets the information of the interface bus 19 to be written in the data bus, the address corresponding to the transmitter/receiver block 13, 14 to which the information is intended to be written to the address bus, and thereafter the state of the write line (IOWR) in the control bus of the interface bus 19 is set into the logical value corresponding to the write enable state, e.g. the logical 0 state. Thus the expansion card 1 is used to transmit the information located in the data bus of the expansion card interface to a buffer (not shown), from which the information can be converted into serial format and transmitted to the serial bus 11, 12 depending on that whether the information was written into the asynchronous transmitter/receiver block 13 or into the synchronous transmitter/receiver block 14.

By means of the arrangement according to FIG. 1, it is possible to transmit messages between the electronic device 3 and the expansion card 1. This example is also illustrated in the appended FIG. 3. The figure shows information transfer in a layer structure, which advantageously comprises at least an application layer (layer 7), a link layer (layer 2) and a physical layer (layer 1). The user interface module 203 transmits commands (e.g. selection of a telephone number), parameters (e.g. telephone number), etc. to the application programming interface 204. The application programming interface 204 transmits the messages to the device driver 205, from which they are transmitted via the expansion card interface 2 to the expansion card 1 (block 301). In the expansion card 1 the messages are transmitted on the asynchronous serial bus 11 to the asynchronous serial interface block 8 of the digital signal processing unit. The digital signal processing unit 6 transmits the messages to the controller 4 to be processed. Advantageously the messages that arrive from the processing software 302 of the asynchronous bus interface of the controller 4, are transmitted further e.g. to the application program 303 of the controller 4, in which they are examined. Information to the opposite direction functions similarly to the above description, but naturally in the opposite order.

The operating system 201 of the electronic device 3 comprises data structures or the like, by means of which the operating system 201 maintains the resources required by the active application programs, e.g. memory, interfaces, device drivers and messages transmission, which is prior art known by anyone skilled in the art and thus need not be discussed in more detail in this context.

The present invention is not restricted solely to the embodiments presented above, but it can be modified within the scope of the appended claims.

The invention claimed is:

1. A method for starting user interface software of an expansion card in an electronic device, which expansion card can be coupled in a releasable manner to the electronic device, wherein the user interface software comprises at least a basic module and a user interface module, the method comprising:
- storing the basic module and the user interface module in a memory of the electronic device, the basic module and the user interface module being separate parts of the same user interface software prior to starting the user interface software;
- starting the user interface software in at least two phases, wherein the first phase includes
- starting the basic module by loading the previously stored basic module, the started basic module setting up the communication signalling between the user interface layer and the device drivers layer of the electronic device, wherein the setting includes initialization of parameters necessary for the expansion card and generating of error messages when operating system incompatibility issues are detected;
- and the second phase includes:
- using the setting by the basic module, detecting the coupling of the expansion card to the electronic device, and
- starting the user interface module by loading the previously stored user interface module when the coupling of the expansion card to the electronic device is detected; and
- utilizing the started user interface module to control the function of the expansion card.

2. The method according to claim 1 wherein said basic module of the user interface software controls the execution of the second phase.

3. The method according to claim 2, wherein in the electronic device an application programming interface and a device driver are executed in order to arrange communication between the user interface software and the expansion card, wherein when the expansion card is coupled to the electronic device, information on the coupling of the expansion card is transmitted from the device driver to the application programming interface from which the information is transmitted to the basic module, and wherein the loading and start-up of the user interface module is initiated from the basic module.

4. The method according to claim 3, wherein the electronic device an operating system is executed to control the function of the electronic device, and in the coupling of the expansion card an interrupt signal is produced, wherein in the operating system the possible cause for the interrupt signal is examined and information on the coupling of the expansion card is transmitted to the device driver.

5. Method according to claim 1, wherein when the expansion card is detached from the electronic device, the user interface module is halted and the basic module is kept in operation.

6. The method according to claim 5, wherein when the user interface module is being loaded, an area in the memory is allocated for the user interface module, and when the expansion card is detached from the electronic device, the area allocated in the memory for the user interface module is deallocated.

7. An electronic device comprising:
- a program loader configured to load user interface software in an electronic device;
- a connecting element for coupling an expansion card in a releasable manner to the electronic device; and
- a processor configured to load, start and execute program modules in the electronic device;
- wherein the user interface software comprises at least a basic module and a user interface module, said basic module and said user interface module stored in a memory of the electronic device, the basic module and the user interface module being separate parts of the same user interface software prior to starting the user interface software, and before connecting the expansion card with the electronic device, and the processor is configured to:
- start the basic module by loading the previously stored basic module, the started basic module setting up communication signalling between a user interface layer and device driver layers in the electronic device, including initializing parameters necessary for the expansion card and a generation of error messages related to a detection of system incompatibilities;
- start the user interface module by loading the previously stored user interface module after a detecting element, using the setting by the basic module, detects that the expansion card is coupled to the electronic device;
- wherein the started user interface module is used to control the function of the expansion card.

8. The electronic device according to claim 7, wherein said basic module of the user interface software comprises means for controlling the execution of the loading of the user interface module.

9. The electronic device according to claim 8, wherein the electronic device comprises means for executing the device driver to arrange communication between the user interface software and the expansion card, means for recognizing the coupling of the expansion card to the electronic device and means for transmitting the information on the coupling of the expansion card from the device driver to the basic module, and wherein the basic module comprises means for loading and starting the user interface module.

10. The electronic device according to claim 9, wherein the electronic device comprises means for executing an application programming interface, and said means for transmitting information on the coupling comprises an application programming interface.

11. The electronic device according to claim 10, wherein the electronic device comprises means for executing an operating system to control the function of the electronic device, means for producing an interrupt signal on the coupling of the expansion card to the electronic device, and wherein the operating system comprises means for examining the cause of said interrupt signal and means for transmitting information on the coupling to the device driver.

12. The electronic device according to claim 7, wherein the expansion card comprises a transmitter/receiver unit and a high frequency power amplifier.

13. The electronic device according to claim 7, wherein it is a data processor.

14. An apparatus comprising:
- storage for storing user interface software of an expansion card which expansion card can be coupled in a releasable manner to an electronic device; and
- a processor configured to load, start and execute program modules in the electronic device;
- wherein the user interface software comprises at least a basic module and a user interface module, said basic module and said user interface module being separate parts of the same user interface software and stored within the storage prior to starting the user interface software and before connecting the expansion card with the electronic device, and a loading program comprises procedures for loading the user interface software in at least two phases, wherein in the first phase the loading and start-up of the basic module is executed by loading the previously stored basic module and setting up communication signaling between a user layer and a device driver layer of the electronic device, the setting including an initialization of parameters necessary for the expansion card and generating error messages when operating system incompatibilities are detected, and the second phase is executed using the setting by the basic module when the expansion card is coupled to the electronic device;

a detecting element configured to send a signal to the started basic module when the expansion card is attached to the electronic device, wherein the started basic module starts the user interface module by loading the previously stored user interface module, wherein the started user interface module is configured to control a function of the expansion card.

15. A method for loading the user interface software of an expansion card in an electronic device, which expansion card can be coupled in a releasable manner to the electronic device, wherein the method comprises:

executing the loading of the user interface software in at least two phases, wherein the user interface software comprises at least a basic module and a user interface module, said basic module and said user interface module being separate parts of the same user interface software stored in memory of the electronic device prior to starting the user interface software and before connecting the expansion card with the electronic device, and wherein the first phase includes:

loading and starting the basic module by loading the previously stored basic module, and using the started basic module to set up communication signalling between a user interface layer and device drivers layer of the electronic device, including initializing parameters necessary for the expansion card and generating error messages when system incompatibilities are detected;

the second phase includes:

using the settings by the basic module, detecting the coupling of the expansion card to the electronic device, and loading the previously stored user interface module and starting the user interface module when the coupling of the expansion card to the electronic device is detected; and using the started user interface module to control functions of the expansion card.

16. The method according to claim 15 wherein said basic module of the user interface software controls the execution of the loading of the user interface module.

17. The method according to claim 16, wherein in the electronic device an application programming interface and a device driver are executed in order to arrange communication between the user interface software and the expansion card, wherein when the expansion card is coupled to the electronic device, information on the coupling of the expansion card is transmitted from the device driver to the application programming interface from which the information is transmitted to the basic module, and wherein the loading and start-up of the user interface module is initiated from the basic module.

18. The method according to claim 17, wherein in the electronic device an operating system is executed to control the function of the electronic device, and in the coupling of the expansion card an interrupt signal is produced, wherein in the operating system the possible cause for the interrupt signal is examined and information on the coupling of the expansion card is transmitted to the device driver.

19. Method according to claim 15, wherein when the expansion card is detected from the electronic device, the user interface module is halted and the basic module is kept in operation.

20. The method according to claim 19, wherein when the user interface module is being loaded, an area in the memory is allocated for the user interface module, and when the expansion card is detached from the electronic device, the area allocated in the memory for the user interface module is deallocated.

21. An electronic device comprising:

user interface software comprising at least a basic module and a user interface module;

a connecting element for coupling an expansion card in a releasable manner in the electronic device; and a processor configured to load, start and execute program modules in the electronic device;

wherein said basic module and said user interface module being separate parts of the same user interface software and stored within a memory of the electronic device prior to starting the user interface software, and the processor is configured to:

start execution of the basic module by loading the previously stored basic module of the user interface software and, the started basic module setting up the communication signaling between the user interface layer and the device drivers layer of the electronic device, wherein the setting includes initialization of parameters necessary for the expansion care and generating of error messages when operating system incompatability issues are detected; and loading the previously stored user interface module comprising, when the expansion card is coupled to the electronic device, using the setting by the started basic module and starting the user interface module; and wherein the started user interface module is utilized to control the function of the expansion card.

22. The electronic device according to claim 21, wherein said basic module of the user interface software comprises means for controlling the execution of the second phase.

23. The electronic device according to claim 22, wherein the electronic device comprises means for executing the device driver to arrange communication between the user interface software and the expansion card, means for recognizing the coupling of the expansion card to the electronic device and means for transmitting the information on the coupling of the expansion card from the device driver to the basic module, and wherein the basic module comprises means for loading and starting the user interface module.

24. The electronic device according to claim 23, wherein the electronic device comprises means for executing an application programming interface, and said means for transmitting information on the coupling comprises an application programming interface.

25. The electronic device according to claim 24, wherein the electronic device comprises means for executing an operating system to control the function of the electronic device, means for producing an interrupt signal on the coupling of the expansion card to the electronic device, and wherein the operating system comprises means for examining the cause of said interrupt signal and means for transmitting information on the coupling to the device driver.

26. The electronic device according to claim 21, wherein the expansion card comprises a transmitter/receiver unit and a high frequency power amplifier.

27. The electronic device according to claim 21, wherein it is a data processor.

28. A computer readable storage medium for storing user interface software of an expansion card in an electronic device comprising a processor configured to load, start and execute program modules in the electronic device, which expansion card can be coupled in a releasable manner to the electronic device, wherein the user interface software comprises at least a basic module and a user interface module, said basic module and said user interface module being separate parts of the same user interface software and stored within a memory of the electronic device before connecting the expansion card with the electronic device, and the loading of program modules comprises procedures for loading the user interface software in at least two phases, wherein in a first phase the loading and start-up of the basic module is executed by loading the previously stored basic module and using the started basic module to set setting up the communication signalling between the user interface layer and the device driver layer of the electronic device, wherein the setting includes initialization of parameters necessary for the expansion card and generating of error messages when operating system incompatibility issues are detected, and a second phase is executed when it is detected that the expansion card is coupled to the electronic device and the basic module is already loaded including starting the user interface module by loading the previously stored user interface module and utilizing the started user interface module to control the function of the expansion card.

29. The method of claim 15 further comprising stopping the loading between the first and second phases.

30. The electronic device of claim 21, wherein the program loader is configured to stop the loading between the loading of the basic module and user interface module.

31. The storage of claim 28, wherein the loading is stopped between the first and second phases.

* * * * *